United States Patent
Zhang et al.

(10) Patent No.: US 9,614,246 B2
(45) Date of Patent: Apr. 4, 2017

(54) HIGH-CAPACITY CYLINDRICAL LITHIUM ION BATTERY AND PRODUCTION METHOD THEREOF

(75) Inventors: Guiping Zhang, Guangdong (CN); Panyi Zhang, Guangdong (CN)

(73) Assignee: Shihlien Apex Huaian Technology Co., Ltd., Huaian (CN)

( * ) Notice: Subject to any disclaimer, the term of this patent is extended or adjusted under 35 U.S.C. 154(b) by 401 days.

(21) Appl. No.: 14/119,451

(22) PCT Filed: Jul. 4, 2012

(86) PCT No.: PCT/CN2012/078196
§ 371 (c)(1),
(2), (4) Date: Nov. 22, 2013

(87) PCT Pub. No.: WO2013/159454
PCT Pub. Date: Oct. 31, 2013

(65) Prior Publication Data
US 2014/0087225 A1    Mar. 27, 2014

(30) Foreign Application Priority Data
Apr. 24, 2012 (CN) .......................... 2012 1 0122201

(51) Int. Cl.
| | |
|---|---|
| *H01M 10/04* | (2006.01) |
| *H01M 2/26* | (2006.01) |
| *H01M 10/0525* | (2010.01) |
| *H01M 10/0587* | (2010.01) |
| *B23K 26/20* | (2014.01) |

(52) U.S. Cl.
CPC ....... *H01M 10/0431* (2013.01); *B23K 26/206* (2013.01); *H01M 2/263* (2013.01); *H01M 10/049* (2013.01); *H01M 10/0422* (2013.01); *H01M 10/0525* (2013.01); *H01M 10/0587* (2013.01); *Y02E 60/122* (2013.01); *Y02P 70/54* (2015.11); *Y02T 10/7011* (2013.01); *Y10T 29/301* (2015.01)

(58) Field of Classification Search
None
See application file for complete search history.

(56) References Cited

U.S. PATENT DOCUMENTS

| | | | | |
|---|---|---|---|---|
| 2003/0194607 | A1* | 10/2003 | Huang | H01M 4/5815 429/176 |
| 2008/0078815 | A1* | 4/2008 | Taniguchi | B23K 20/10 228/110.1 |
| 2011/0104539 | A1* | 5/2011 | Oh | H01M 2/22 429/94 |

FOREIGN PATENT DOCUMENTS

JP    2007234445 A  *  9/2007

* cited by examiner

*Primary Examiner* — Lucas J. O'Donnell (57) ABSTRACT

The invention discloses a high-capacity cylindrical lithium ion battery. Tab-position end face is shaped; a high frequency oscillation and pressure are applied on to make the foil bodies softened in the scope of 0.1-6.5 mm. At the instant of high-frequency oscillation, the rigidity of the foil body is greatly decreased; and the foil bodies are mutually wound and compressed together, so that the weight density of the foil body in unit volume is increased and meanwhile, the rigidity of the compressed foil body at the Tab-position end face is greatly increased, thereby laying a firm foundation for laser welding of the 1 Tab-position end face and a current collector, increasing a laser welding effective area of the Tab-position end face and the current collector, and improving the welding strength.

6 Claims, 7 Drawing Sheets

HIGH-CAPACITY CYLINDRICAL LITHIUM ION BATTERY AND PRODUCTION METHOD THEREOF

TECHNICAL FIELD

The present invention relates to technical field of chemical power sources involved with new energy sources and energy accumulation power stations, in particular to high-capacity cylindrical lithium ion battery technology for storing wind energy and solar energy and power.

DESCRIPTION OF THE RELATED ART

At present, as wind energy and solar energy technologies develop quickly, the generated unstable electricity is easy to impact the power grid, so establishing corresponding storage power stations is imperative, and high-reliability high-capacity lithium ion batteries are required to accumulate the electricity generated from the wind and solar energies. The storage power stations impose very high requirements for batteries, such as high reliability, and long service life (over years). High-capacity cylindrical lithium ion batteries have advantages of high energy density (≥130 wh/kg), simple manufacturing process, etc.

However, it is technically unsuitable for manufacturing the high-capacity cylindrical lithium ion batteries with methods for manufacturing common low-capacity cylindrical lithium batteries because of high capacity (>30 Ah) and long electrodes of the high-capacity cylindrical lithium ion batteries. Anodes and cathodes of the existing common low-capacity cylindrical lithium ion batteries are manufactured in an interval coating way. The purpose of interval coating is to weld the strip-like tabs (made of nickel, aluminum or copper). Internal coating adopted in manufacturing of the high-capacity cylindrical lithium ion batteries usually causes problems of low pole piece rolling speed, a large number of strip-like tabs required to be welded, heavy workload of welding between the strip-like tabs and the coating intervals, pasting of insulation tapes. This process is completed and low-efficiency and reduces the capacity density. Therefore, the interval coating is not suitable for manufacturing of the pole pieces of the high-capacity cylindrical lithium ion batteries. The pole pieces shall be treated in this way: leave uncoated areas on the left or right foil shaped current collectors of each pole piece, and then wind the uncoated foil shaped current collectors to form tab-position end faces. The uncoated foil bodies of the tab-position end faces are used for leading out current (output).

Foil bodies of the tab-position end faces of the high-capacity cylindrical lithium ion battery are required to be welded together with the collector plates such that the current of the battery is output from the collector plates. The foil bodies (copper foils or aluminum foils) of the tab-position end faces are very thin (6-30 micro meter), flexible and easy to deform, so the whole foil bodies will bend or deform if applied with a pressure when being welded with the collector plate, causing diameter increase or projection to the cylindrical tab-position end faces. Thus, the core winder is short-circuited because of failing to enter the case or being conducted with the case. If the pressure is directly applied onto the end faces of the foil bodies, the area welded together with the collector plates is small and the welding strength is low because the end faces are deformed to the unsmooth. Therefore, it is every necessary to shape the foil bodies of the tab-position end faces.

One of the foil body shaping method in the prior art is to pre-slit the uncoated portions of the cathode and anode electrodes into strips and weld the strip-like foil bodies on a bottle-lid shaped collector plate after the cathode electrode, anode electrode and separator are wound to form a core winder. According to this method, the foil bodies are required to be slit into strips through laser. This process is complicated, in low efficiency and high in cost. The strip-like foil bodies have low strength and are easy to break by pulling when welded on the collector plate, and bear small currents in comparison with the original foil bodies. So, half the result is gotten with twice the effort.

In addition, cases of the existing small-capacity cylindrical batteries usually have slots or have no slots at one end, while the slots of the small-capacity cylindrical batteries are used for mechanical oscillating and pressing and sealing. The mechanical bending and pressing type sealing is realized by bending the metal wall at the case end for several folds and then wrapping the organic sealing rings of the end caps with the folded wall. The mechanical seal usually has micro-leakage after long-time service (over 15 years).

SUMMARY OF THE INVENTION

The technical problem to be solved by the present invention is to provide a simple method for shaping tab-position end faces of a core winder increasing in weight and density of foil bodies in a unit volume, technology and method for producing high-capacity cylindrical lithium ion batteries.

To solve the mentioned technical problem, the present invention adopts the following technical scheme: a method for shaping tab-position end faces of a core winder is provided, comprising: oscillating foil bodies of the tab-position end faces at a high frequency, and applying a pressure to soften the foil bodies in a scope of 0.1-6.5 mm of the tab-position end faces so that the foil bodies of the cathode and anode of the tab-position end face are entangled together and compressed together.

Wherein, the foil bodies of the tab-position end face are oscillated at a high frequency with a 0.1-100.5 KW high-power ultrasonic wave.

Wherein, the foil bodies of the cathode and cathode are respectively compressed and decreased by 0.1-6.5 mm.

Figure 10:
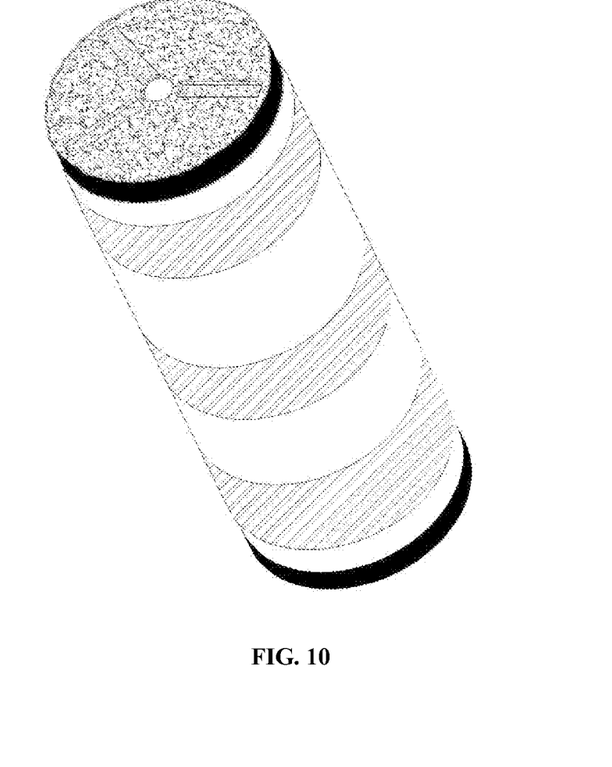
FIG. 10 is the structure diagram of shaped end face of a core winder with pits of the present invention.

To solve the above technical problems, the present invention adopts another technical scheme: a method for producing a high-capacity cylindrical lithium ion battery is provided, comprising the following steps:

1) preparing the core winder: slurrying for the cathode, continuously coating the cathode electrode, rolling the cathode electrode, slitting the cathode electrode, slurrying for the anode, continuously coating the anode electrode, rolling the anode electrode, slitting the anode electrode, winding the cathode and anode electrodes together with separators to obtain the core winder;

2) shaping and welding the tab-position end faces of the core winder: oscillating foil bodies of the tab-position end faces at a high frequency, and applying a pressure to soften the foil bodies in a scope of 0.1-6.5 mm of the tab-position end faces so that the foil bodies of the cathode and anode are entangled and compressed together; The shaped tab-position end face and current collector are welded together. The ultrasonic high-frequency oscillation head is a planar face or a planar face with bulges. If the tab-position end face is oscillated by the ultrasonic high-frequency oscillation wave that the pits of tab-position end face would be shaped, as shown in FIG. 10.

3) assembling the battery case: welding the collector plate with a tab, welding the tab with the bottoms of positive and negative terminals, installing the winder with the collector plate and the tab into a case, laser welding to seal the battery case and an end cap, drying in vacuum, filling electrolyte, forming and sorting, and sealing with a bead. The current collector and tab-position end face can be integrated as whole and so that can omitted the welding sequence.

Wherein, the cathode electrode includes a cathode active substance, a cathode current collector and a binder; the cathode active substance may be lithium iron phosphate, lithium cobalt oxide, lithium manganate, lithium cobalt nickel manganese oxide, lithium manganese phosphate, iron lithium manganese phosphate, or lithium manganous silicate; the cathode current collector is an aluminum foil; the binder may be polyenenitrile series binder, Arabic gum, modified polyoxyethylene, polyvinylidene fluoride, butadiene styrene rubber emulsion or carboxymethylcellulose; the anode electrode includes an anode active substance, an anode current collector and a binder; the anode active substance may be artificial graphite, natural graphite, mixture of the artificial graphite and the natural graphite, mesophase carbon micro beads, tin, silicon or lithium titanate, and the binder may be polyenenitrile series binder, Arabic gum, modified polyoxyethylene, polyvinylidene fluoride, butadiene styrene rubber emulsion or carboxymethylcellulose.

Wherein, the separator may be a polypropylene-polyethylene-polypropylene compound micro-porous separator, single polyethylene micro-porous separator, polyimide micro-porous separator or polytetrafluoroethylene micro-porous separator.

Wherein, the electrolyte comprises a solvent, a soluble lithium salt and an additive; the solvent may be ethylene carbonate, methyl ethyl carbonate, propylene carbonate, dimethyl carbonate, diethyl carbonate, methyl propyl carbonate or ethyl acetate; the soluble lithium salt may be lithium hexafluorophosphate, lithium bis(oxalate)borate or lithium imide; and the additive may be propane sultone, vinylene carbonate, fluorination carbonate, glycol sulfite, hexamethyldisilazane or triphenyl phosphate.

To solve the above technical problems, the present invention adopts another technical scheme: A high-capacity cylindrical lithium ion lithium battery is provided, comprising a battery case, a core winder disposed in the battery case, a collector plate pressing and covering two ends of the core winder, terminals connected to the current collector through tabs and end caps at two poles of the battery, wherein the terminals include a positive terminal and a negative terminal; the end caps include a cathode end cap and an anode end cap; and the collector plate comprises a cathode collector plate and an anode collector plate.

The positive terminal is made of aluminum alloy, while the negative terminal is made of nickel plated copper; the cathode collector plate is made of aluminum alloy, while the anode collector plate is made of nickel plated copper; the cathode collector plate and the anode collector plate are provided with holes for inflow of the electrolyte.

The cathode collector plate and the cathode tab are fixed through laser welding; the cathode tab is made of aluminum alloy; the other end of the cathode tab is welded with the cathode end cap; the anode collector plate is fixed with the anode tab through laser welding; the anode tab is made of nickel plated copper; the other end of the anode tab is fixed with the negative terminal through laser welding.

The foil bodies of the tab-position end faces of the cathode and cathode in the core winder are respectively compressed and decreased by 01-6.5 mm; and the foil bodies of the tab-position end faces are entangled mutually.

Wherein, the battery case is provided with slots at positions of the cathode tab and anode tab, and the slots surround the cylinder by a circle.

Wherein, the positive terminal and the cathode end cap are integrally molded by an aluminum ingot through one-time oscillating and pressing or casting.

Figure 1:
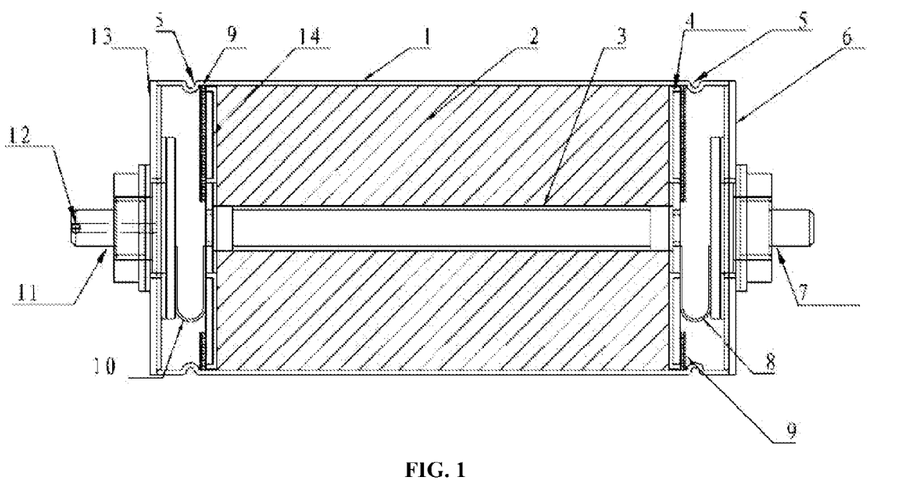
FIG. 1 is a structural view of a high-capacity cylindrical lithium ion lithium battery of the present invention.
Figure 2:
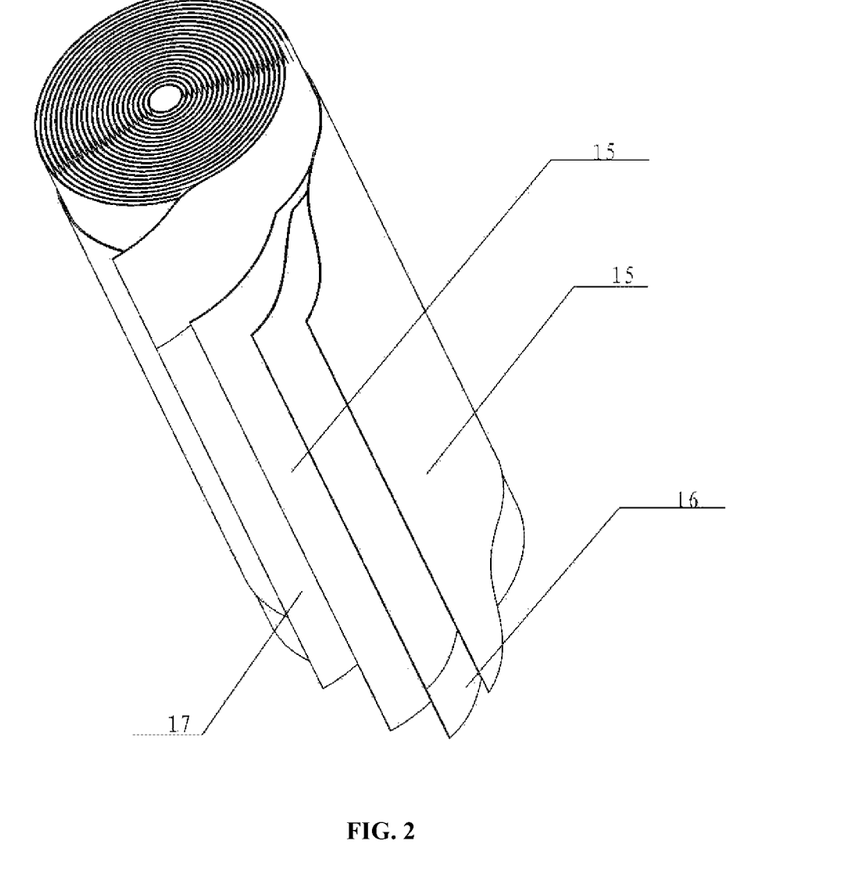
FIG. 2 is a structural view of a core winder of the high-capacity cylindrical lithium ion lithium battery of the present invention.
Figure 3:
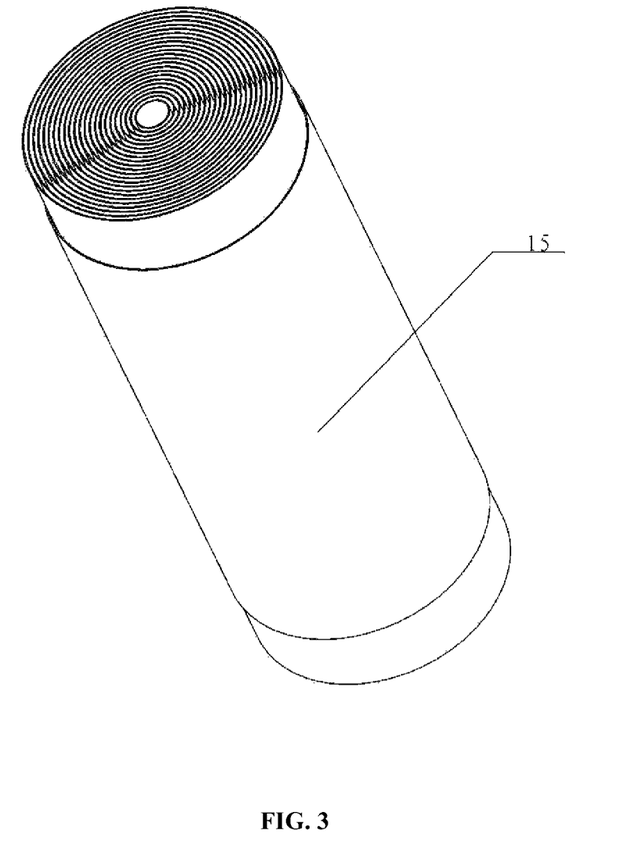
FIG. 3 is a structural view of a core winder of the high-capacity cylindrical lithium ion lithium battery of the present invention before shaping.
Figure 4:
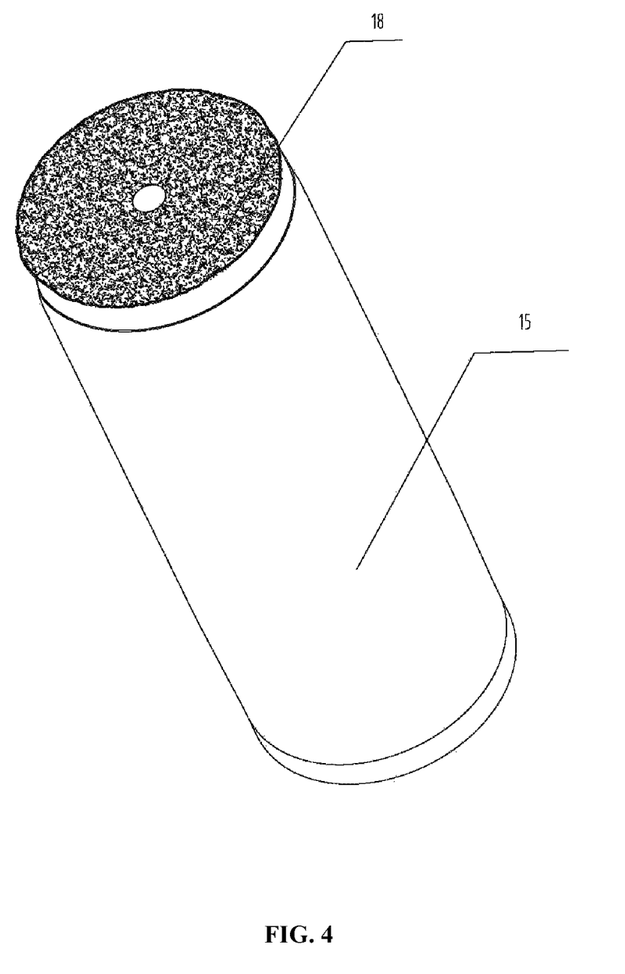
FIG. 4 is a structural view of a core winder of the high-capacity cylindrical lithium ion lithium battery of the present invention after shaping.
Figure 5:
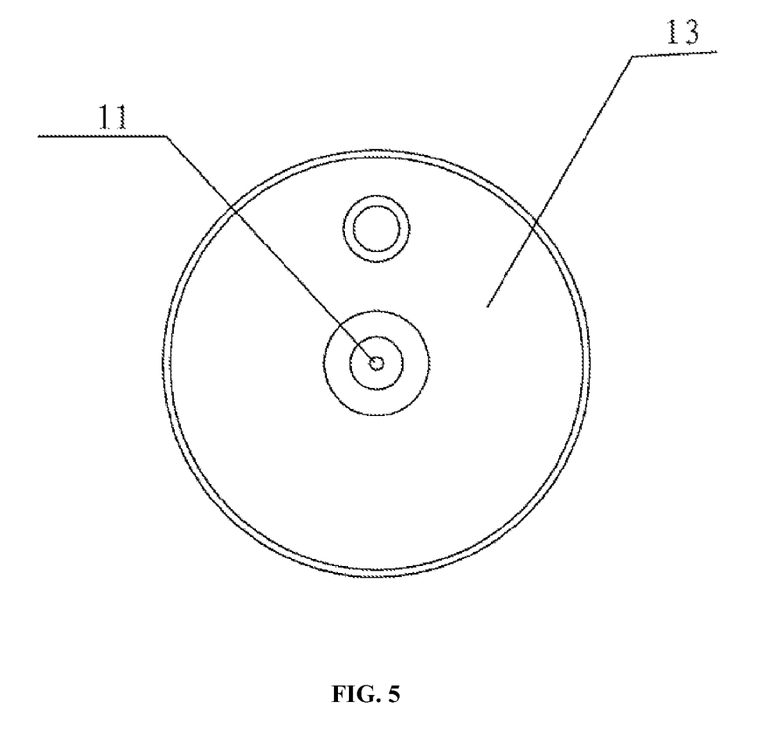
FIG. 5 is a structural view of integration of the cathode end cap, boss and terminals of the high-capacity cylindrical lithium ion lithium battery of the present invention.
Figure 6:
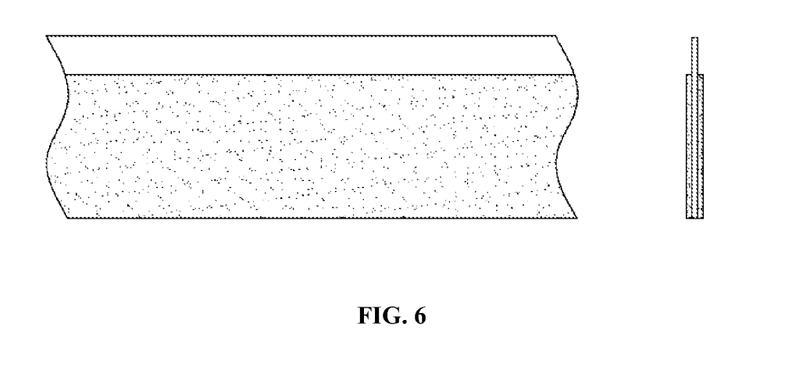
FIG. 6 is a schematic view of the shape of the cathode electrode of the high-capacity cylindrical lithium ion lithium battery of the present invention.
Figure 7:
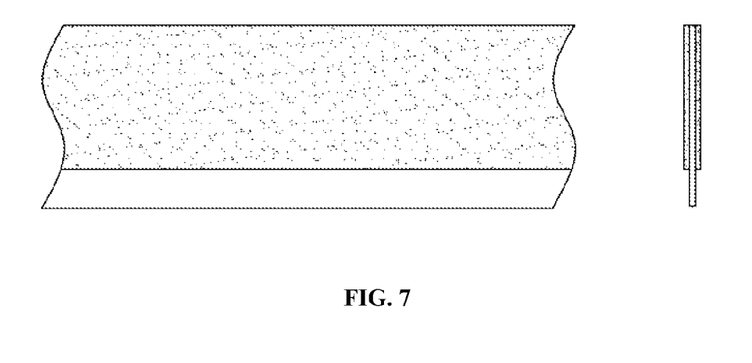
FIG. 7 is a schematic view of the shape of an anode electrode of the high-capacity cylindrical lithium ion lithium battery of the present invention.
Figure 8:
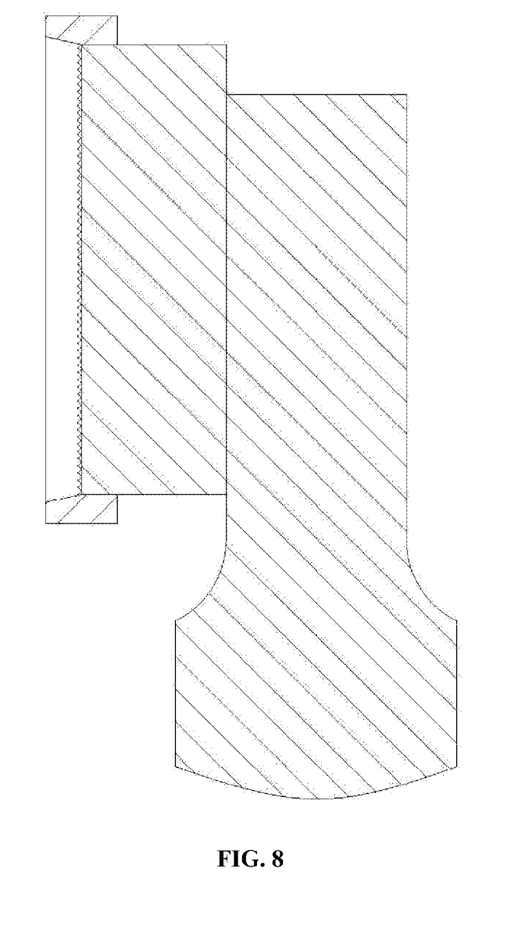
FIG. 8 is the ultrasonic high-frequency oscillation head of the present invention.
Figure 9:
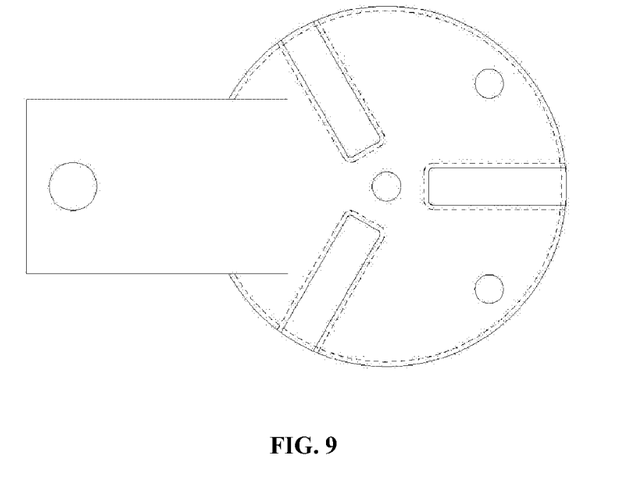
FIG. 9 is the integration on tab-position end face and current collector of the present invention.

The present invention had the following beneficial effects: the foil bodies in a scope of 0.1-6.5 mm of the tab-position end face will be "instantly plasticized" and softened on condition that the foil bodies of the tab-position end face are oscillated at a high frequency, softened and applied with a high pressure; at the moment of high-frequency oscillation, the rigidity of the foil bodies is greatly reduced, the foil bodies are mutually entangled together and compressed, so weight and density in a unit volume increase; meanwhile, the tab-position end faces are rubbed and flattened, and the rigidity of the compressed foil bodies of the end faces increases tremendously, thus laying a solid foundation for laser welding between the tap-position end faces and the collector plates for the next step, enlarging the effective welding area and improving the welding strength of the laser welding between the tab-position end faces and the collector plates (as shown in FIG. 1). In comparison with the foil bodies in the prior art that are strips and easy to be broken when welded on the collector plate, and bear small currents. The invention achieves a great improvement.

DESCRIPTION OF MARK NUMBERS

1: battery case; 2; core winder; 3: mandrel; 4: anode collector plate; 5: channel; 6: anode end cap; 7: negative terminal; 8: anode tab; 9: insulation pad; 10: cathode tab; 11: positive terminal; 12: bead; 13: cathode end cap: 14: cathode collector plate; 15: separator; 16: anode electrode; 17: cathode electrode; 18: tab-position end face.

DETAILED DESCRIPTION OF THE PRESENT INVENTION

The technical contents, structural features, objectives and effects of the present invention are described in detail accompanying the following embodiments and attached drawings.

Embodiment 1

The tab-position end face 18 of the present invention is an end face formed by the edge of a copper foil of uncoated portions of the anode or the edge of the uncoated aluminum foil of the cathode when the cathode and anode electrodes as well as the separator 15 are wound, equal to the cylindrical bottom face of the core winder 2. The aluminum foil and copper foil are very thin (with a thickness of less than 0.03 mm) and flexible, so the present invention provides a method for shaping the foil bodies (such as copper foils or aluminum foils) of the tab-position end faces 18 of the inner core winder 2 of the high-capacity cylindrical lithium ion battery. The aluminum foil bodies and copper foil bodies of the tab-position end faces 18 of the cathode and anode are simultaneously oscillated, softened and pressed at a high frequency with a 3.5 KW ultrasonic wave high-frequency oscillating and pressing head. At the moment of high-frequency oscillation, the rigidity of the foil bodies is greatly reduced, and the foil bodies are mutually entangled together to form a "junction" and compressed. The foil bodies of the cathode and anode are respectively compressed and decreased by 1.5 mm, meaning that the total height of the winder is lowered by approximately 3 mm. Weight and density of the foil bodies in a unit volume increase. Meanwhile, the tab-position end faces 18 are rubbed and flattened, and the rigidity of the compressed foil bodies of the end faces increases tremendously, thus laying a solid foundation for laser welding between the tap-position end faces and the collector plates in the next step, enlarging the effective welding area and improving the welding strength of the laser welding between the tab-position end faces and the collector plates.

The method for shaping the tab-position end faces 18 of the core winder 2 of the present invention is also suitable for chemical and physical energy accumulation devices such as the super capacitor. The method is suitable for lithium batteries of the lithium iron phosphate battery system, lithium cobalt oxide battery system, ternary material battery system, lithium titanate battery, lithium manganese phosphate battery systems.

Embodiment 2

Refer to FIGS. 1 to 5. The figures show the high-capacity cylindrical lithium ion battery of the present invention, comprising a battery case 1, a core winder 2 disposed in the battery case 1 and winding around a mandrel 3, collector plates pressing and covering two ends of the core winder 2, terminals connected to the collector plates through tabs and end caps at two poles of the battery. The terminals include a positive terminal 11 and a negative terminal 7. The end caps include a cathode end cap 13 and an anode end cap 6. The collector plates include a cathode collector plate 14 and an anode collector plate 4. The positive terminal 11 is made of aluminum alloy, while the negative terminal 7 is made of nickel plated copper. The cathode collector plate 14 is made of aluminum alloy, while the anode collector plate 4 is made of nickel plated copper. The cathode collector plate 14 and the anode collector plate 4 are provided with holes for inflow of electrolyte. The anode collector plate 4 is provided with an insulation pad 9 on the side contacting with the anode tab 8. The cathode tab 10 is made of aluminum alloy, and the other end of the cathode tab 10 is welded with the cathode end cap 13. The anode collector plate 4 is fixed with the anode tab 8 through laser welding. The anode tab 8 is made of nickel plated copper. The other end of the anode tab 8 is fixed with the negative terminal 7 through laser welding. The foil bodies of the tab-position end faces 18 of the cathode and anode of the core winder 2 are respectively compressed and decreased by 1.5 mm. The foil bodies of the tab-position end faces 18 are entangled mutually.

The method for producing the high-capacity cylindrical lithium ion battery comprises the following steps: slurrying for the cathode, continuously coating the cathode electrode, rolling the cathode electrode, slitting the cathode electrode, slurrying for the anode, continuously coating the anode electrode, rolling the anode electrode, slitting the anode electrode, winding the cathode electrode, anode electrode and separator 15 to form the core winder 2; oscillating, rubbing and flattening the tab positions at two ends of the core winder 2 through ultrasonic wave oscillating and pressing, welding collector plates on the shaped tab-position end faces 18, welding the collector plates with the tabs, welding the tabs with the bottoms of the positive and negative terminals; installing the winder with the collector plates and tabs into the case, sealing the battery case 1 and the end caps through laser welding, drying in vacuum, filling electrolyte, forming and sorting, and sealing with a bead 12. Wherein, the method for oscillating, rubbing and flattening the tab positions at two ends of the core winder 2 is the shaping method in embodiment 1.

During production of the high-capacity cylindrical lithium ion battery of the present invention, the battery case 1 is integrally welded with the cathode end cap 13 and the anode end cap 6 of the battery through laser. The positive terminal 11 is made of aluminum alloy, while the negative terminal 7 is made of nickel plated copper. The cathode collector plate 14 is made of aluminum alloy, while the anode collector plate 4 is made of nickel plated copper. The cathode collector plate 14 and the node collector plate 4 are provided with four holes for inflow of the electrolyte. The cathode collector plate 14 is welded together with the cathode tab 10 through laser. The cathode tab 10 is made of aluminum alloy. The other end of the cathode tab 10 is welded with the cathode end cap 13 to be in conduction with the positive terminal 11. The anode collector plate 4 is welded together with the anode tab 7 through laser. The anode tab 8 is made of nickel plated copper. The other end of the anode tab 8 is welded together with the negative terminal 7 through laser. The core winder 2 in the battery case 1 is shaped with the ultrasonic wave high-frequency oscillating, pressing and shaping technology of the present invention. The foil bodies of the tab-position end faces 18 are compressed and decreased by 1.5 mm. The foil bodies of the tab-position end faces 18 are mutually entangled to form "junction", so the rigidity of the foil bodies of the tab-position end faces 18 increases tremendously. The core winder 2 comprises a cathode electrode 17 coated with a lithium iron phosphate active substance, an anode electrode 16 coated with a graphite active substance, a separator 15 made from polyethylene or polypropylene, and a mandrel 3 made of polytetrafluoroethylene or polypropylene or aluminum and located in the winder centre. The positive terminal of the battery is provided with an inlet. The inlet is sealed with a bead 12 after liquid injection is completed.

According to the method for producing the high-capacity cylindrical lithium ion battery, slurrying for the cathode is to strongly stirring and diffusing lithium iron phosphate, conductive carbons and polyvinylidene fluoride binder (dissolved in solvent NMP) to obtain a slurry, and slurrying for the anode is to strongly stirring and diffusing graphite, conductive carbons and sodium carboxymethylcellulose (CMC), butadiene styrene rubber (SBR) emulsion and polyenenitrile LA132, LA133 series binders (dissolved in de-ionized water) to obtain a slurry.

The cathode electrode 17 comprises a cathode active substance, a cathode current collector and a binder. The active substance of the cathode electrode 17 may be lithium iron phosphate, lithium cobalt oxide, lithium manganate, Lithium cobalt nickel manganese, lithium manganese phosphate, iron lithium manganese phosphate, or lithium manganous silicate; the cathode current collector is an aluminum foil; and the binder may be polyenenitrile series binder, Arabic gum, modified polyoxyethylene, polyvinylidene fluoride, butadiene styrene rubber emulsion or carboxymethylcellulose.

The anode electrode 16 comprises an anode active substance, an anode current collector and a binder. The anode active substance may be artificial graphite, natural graphite, mixture of the artificial graphite and the natural graphite, mesophase carbon micro beads, tin, silicon or lithium titanate; and the binder may be polyenenitrile series binder, Arabic gum, modified polyoxyethylene, polyvinylidene fluoride, butadiene styrene rubber emulsion or carboxymethylcellulose or polyenenitrile LA132, LA133 series.

The separator 15 may be a polypropylene-polyethylene-polypropylene compound micro-porous separator, single polyethylene micro-porous separator, polyimide micro-porous separator or polytetrafluoroethylene micro-porous separator.

The electrolyte comprises a solvent, a soluble lithium salt and an additive; the solvent may be ethylene carbonate, methyl ethyl carbonate, propylene carbonate, dimethyl carbonate, diethyl carbonate, methyl propyl carbonate or ethyl acetate; the soluble lithium salt may be lithium hexafluorophosphate, lithium bis(oxalate)borate or lithium imide; and the additive may be propane sultone, vinylene carbonate, fluorination carbonate, glycol sulfite, hexamethyldisilazane or triphenyl phosphate.

In this embodiment, the battery case 1 is provided with slots 5 at positions of the cathode tab 10 and anode tab 8, and the slots 5 surround the cylinder by a circle. Specifically, the depth of the slots 5 is 0.1-5 mm, and the optimal design size is 3 mm. To manufacture the lithium ion battery, pre-form the slot 5 at one end of the cylindrical battery case 1, then place the core winder 2 into the slot, and form the slot 5 at the other end to obtain the structure of the lithium ion battery with slots 5 at both ends as shown in FIG. 1. The present invention adopts the structure of lithium ion battery with slots 5 at both ends. The slots of the existing small cylindrical battery are used for mechanical oscillating and pressing type sealing, while those of the present invention are used for effectively fixing the internal core binder. Compared with the prior art, the present invention increases the internal space of the battery, reduces insulation pads as stuffing, enhances electrolyte injection amount, lowers risks of damaging the separator 15 of the core winder 2 by high temperature of laser welding for sealing, reduces internal pressure of the battery, increases safety of battery, is good for connection between the collector plates and the tabs of the output terminals and therefore good for large current output, improves the overall performance of the battery, and prolongs the service life of the battery by 5-15 years.

Comparative Embodiment 1

On the basis of the embodiment 2, the tab-position end faces and the collector plate are directly welded through laser; the foil bodies of the tab-position end faces are not subject to shaping through ultrasonic wave high-frequency oscillation; and others are not changed.

Table 1 shows comparison of welding strength of the tab-position end faces and the collector plates.

| | Embodiment 2 Strength of welding between the tab-position end faces shaped through ultrasonic wave high-frequency oscillation, rubbing and flattening and the collector plates | Comparative embodiment 1 Strength of direct laser welding between the unshaped tab-position end faces and the collector plates |
|---|---|---|
| Strength between the tab end faces of the cathode aluminum foil and the aluminum collector plates | 14.6 KG/mm2 | 8.4 KG/mm2 |
| Strength between the tab end faces of the anode copper foil and the aluminum collector plates | 28.3 KG/mm2 | 20.6 KG/mm2 |

The above mentioned description is only the exemplary embodiment of the present invention, which cannot limit the present invention. Within the spirit and principle of the present invention, any modification of the equivalent structure, or direct or indirect application in other related technical fields all shall be included in the protection scope of the present invention.

The invention claimed is:

1. A method for shaping tab-position end faces of a core winder, comprising steps of: oscillating foil bodies of the tab-position end faces with a 0.1-100.5 KW high-power ultrasonic wave at a high frequency above 20,000 Hz, the foil bodies of the tab-position end faces comprising foil bodies of a cathode and foil bodies of an anode, and applying a pressure to soften the foil bodies of the tab-position end faces in a scope of 0.1-6.5 mm of the tab-position end faces such that the foil bodies of the cathode are entangled together and compressed together to form a structure of a foil knot and the foil bodies of the anode are entangled together and compressed together to form a structure of a foil knot; wherein the foil bodies of the cathode and the anode are respectively compressed and decreased by 0.1-6.5 mm in a direction perpendicular to top and bottom faces of the core winder.

2. A method for producing a cylindrical lithium ion battery with a high-capacity above 30 Ah, comprising the following steps:
  1) preparing a core winder: slurrying for a cathode, continuously coating a cathode electrode, rolling the cathode electrode, slitting the cathode electrode, slurrying for an anode, continuously coating an anode electrode, rolling the anode electrode, slitting the anode electrode, winding the cathode and anode electrodes together with a separator to obtain the core winder;
  2) shaping tab-position end faces of the core winder: oscillating foil bodies of the tab-position end faces with a 0.1-100.5 KW high-power ultrasonic wave at a high frequency above 20,000 Hz, the foil bodies of the tab-position end faces comprising foil bodies of a cathode and foil bodies of an anode, and applying a pressure to soften the foil bodies of the tab-position end faces in a scope of 0.1-6.5 mm of the tab-position end faces such that the foil bodies of the cathode are entangled together and compressed together individually to form a structure of a foil knot and the foil bodies of the anode are entangled together and compressed together to form a structure of a foil knot, wherein the foil bodies of the cathode and the anode are respectively compressed and decreased by 0.1-6.5 mm in a direction perpendicular to top and bottom faces of the core winder; and,
  3) assembling a battery case: welding a collector plate with a tab, welding the tab with bottoms of positive and negative terminals, installing the core winder with the collector plate and the tab into the battery case, laser welding to seal the battery case and an end cap, drying in vacuum, filling an electrolyte, and sealing with a bead.

3. The method according to claim 2, characterized in that the cathode electrode includes a cathode active substance, a cathode current collector and a binder; the cathode active substance is lithium iron phosphate, lithium cobalt oxide, lithium manganate, lithium cobalt nickel manganese oxide, lithium manganese phosphate, iron lithium manganese phosphate, or lithium manganous silicate; the cathode current collector is an aluminum foil; the binder is polyenenitrile series binder, Arabic gum, modified polyoxyethylene, polyvinylidene fluoride, butadiene styrene rubber emulsion or carboxymethylcellulose; the anode electrode includes an anode active substance, an anode current collector and a binder; the anode active substance is artificial graphite, natural graphite, mixture of the artificial graphite and the natural graphite, mesophase carbon micro beads, tin, silicon or lithium titanate, and the binder is polyenenitrile series binder, Arabic gum, modified polyoxyethylene, polyvinylidene fluoride, butadiene styrene rubber emulsion or carboxymethylcellulose.

4. The method according to claim 2, characterized in that the separator is a polypropylene-polyethylene-polypropylene compound micro-porous separator, single polyethylene micro-porous separator, polyimide micro-porous separator or polytetrafluoroethylene micro-porous separator.

5. The method according to claim 2, characterized in that the electrolyte comprises a solvent, a soluble lithium salt and an additive; the solvent is ethylene carbonate, methyl ethyl carbonate, propylene carbonate, dimethyl carbonate, diethyl carbonate, methyl propyl carbonate or ethyl acetate; the soluble lithium salt is lithium hexafluorophosphate, lithium bis(oxalate)borate or lithium imide salt; and the additive is propane sultone, vinylene carbonate, fluorination carbonate, glycol sulfite, hexamethyldisilazane or triphenyl phosphate.

6. A high-capacity cylindrical lithium ion lithium battery produced by the method according to claim 2, comprising a battery case, a core winder including a cathode and an anode and disposed in the battery case, a collector plate pressing and covering two ends of the core winder, terminals connected to the collector plate through tabs and end caps at two poles of the battery, wherein the terminals include a positive terminal and a negative terminal; the end caps include a cathode end cap and an anode end cap; and the collector plate comprises a cathode collector plate and an anode collector plate; the tabs include a cathode tab and an anode tab;
  the positive terminal is made of aluminum alloy; the negative terminal is made of nickel plated copper; the cathode collector plate is made of aluminum alloy; the anode collector plate is made of nickel plated copper; the cathode collector plate and the anode collector plate are provided with holes for inflow of an electrolyte;
  the cathode collector plate and the cathode tab are fixed through laser welding; the cathode tab is made of aluminum alloy; the other end of the cathode tab is welded with the cathode end cap; the anode collector plate is fixed with the anode tab through laser welding; the anode tab is made of nickel plated copper; the other end of the anode tab is fixed with the negative terminal through laser welding;
  foil bodies of tab-position end faces of the cathode and the anode in the core winder are respectively compressed and decreased by 0.1-6.5 mm; and the foil bodies of the tab-position end faces of the cathode are entangled mutually and the foil bodies of the tab-position end faces of the anode are entangled mutually.

* * * * *